April 11, 1967　　　　　L. M. COX　　　　　3,313,414
FLOUR SIFTER

Filed Sept. 11, 1964　　　　　　　　　　　4 Sheets-Sheet 1

LOYD MARVIN COX
*INVENTOR.*

BY
ATTORNEY

April 11, 1967 L. M. COX 3,313,414
FLOUR SIFTER
Filed Sept. 11, 1964 4 Sheets-Sheet 2

LOYD MARVIN COX
 INVENTOR.

BY
ATTORNEY

April 11, 1967

L. M. COX 3,313,414

FLOUR SIFTER

Filed Sept. 11, 1964

LOYD MARVIN COX
*INVENTOR.*

BY
ATTORNEY

LOYD MARVIN COX
INVENTOR.

3,313,414
FLOUR SIFTER
Loyd Marvin Cox, 1315 E. Lancaster,
Fort Worth, Tex. 76102
Filed Sept. 11, 1964, Ser. No. 395,683
1 Claim. (Cl. 209—236)

This invention relates to a flour sifter for commercial use, as in restaurants, for sifting for further use flour which has been used for applying surface coatings of dry flour, alone or in combination with suitable batters, to articles of food such as chicken, onion rings, fish, and bakery products, preparatory to cooking such articles, to separate and remove from the flour lumps, dough, or dumplings of predetermined large particle size.

In frying chicken, for example, in large quantities it is customary to provide a pan of flour and a pan of batter, and to roll the pieces of chicken, after washing them, first in the flour, then in the batter, and finally in the flour again, by batches, whereby the flour in the pan tends to become wet from repeated contact with the chicken and forms lumps, dough, or dumplings which after a time must be discarded.

In practice much good, usable flour has been discarded along with the lumps, dough, or dumplings, whereby it has been wasted, in food flouring operations as described for the reason that suitable means for sifting the used flour, to thereby separate and recover it, has not heretofore been conveniently available.

An object of this invention is to provide a simple and compact apparatus for the purpose described which requires little space and may be fabricated and operated economically, and which not only is efficient and durable in use but is completely sanitary.

The invention will be readily understood by referring to the following description and the accompanying drawing, in which.

Figure 1:
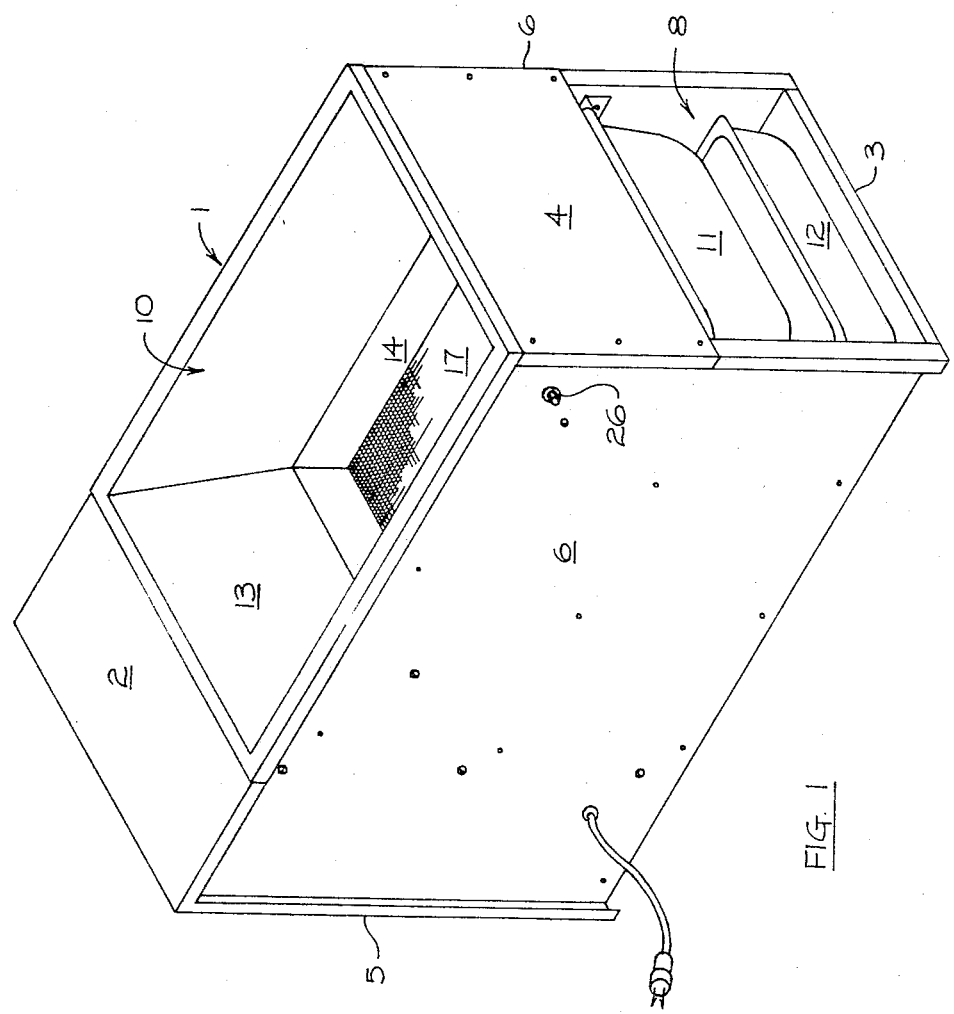
FIG. 1 is an isometric view showing a flour sifter embodying the invention as seen from the top, one side, and one end thereof.
Figure 2:
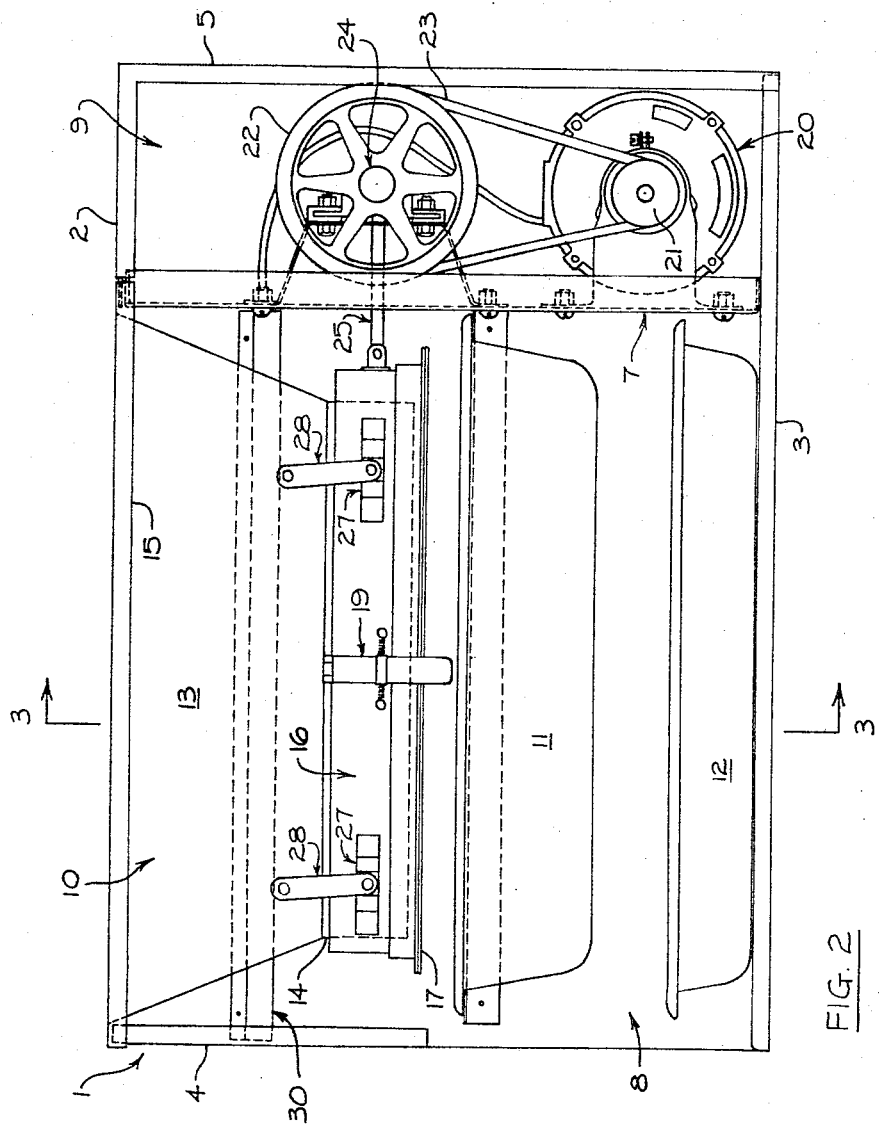
FIG. 2 is a side elevational view showing the flour sifter illustrated in FIG. 1 with one of its side walls removed.
Figure 5:
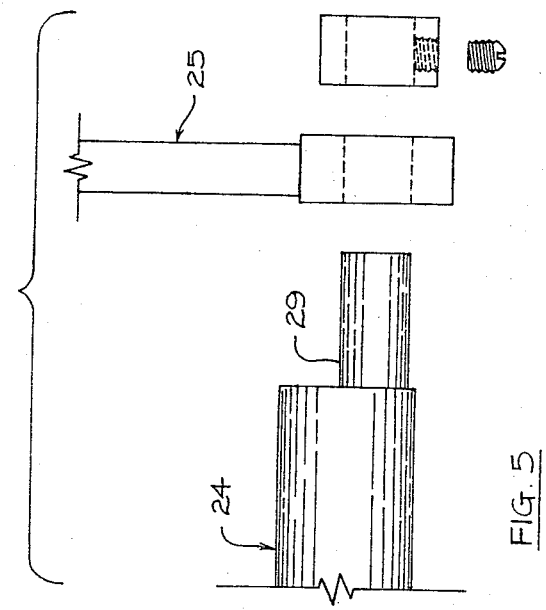
Figure 3:
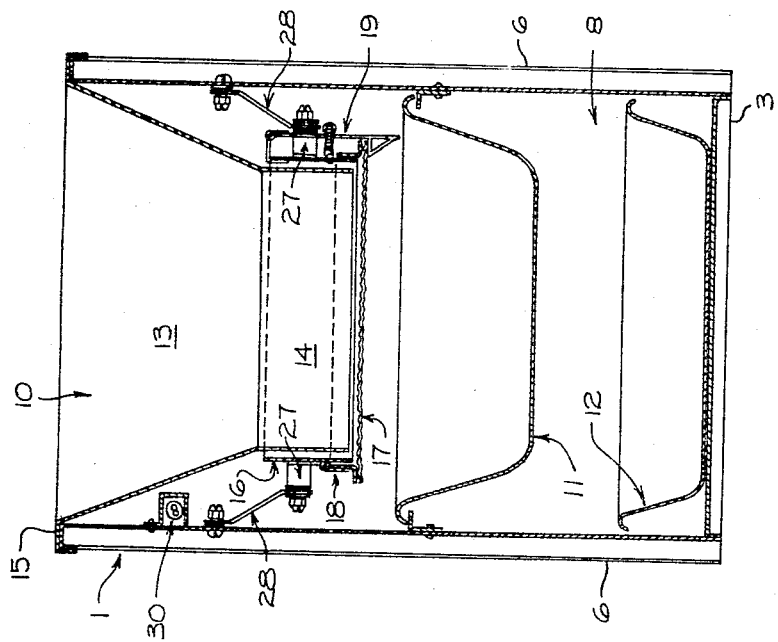
FIG. 3 is a sectional elevational view taken on the line 3—3 of FIG. 2.
Figure 4:
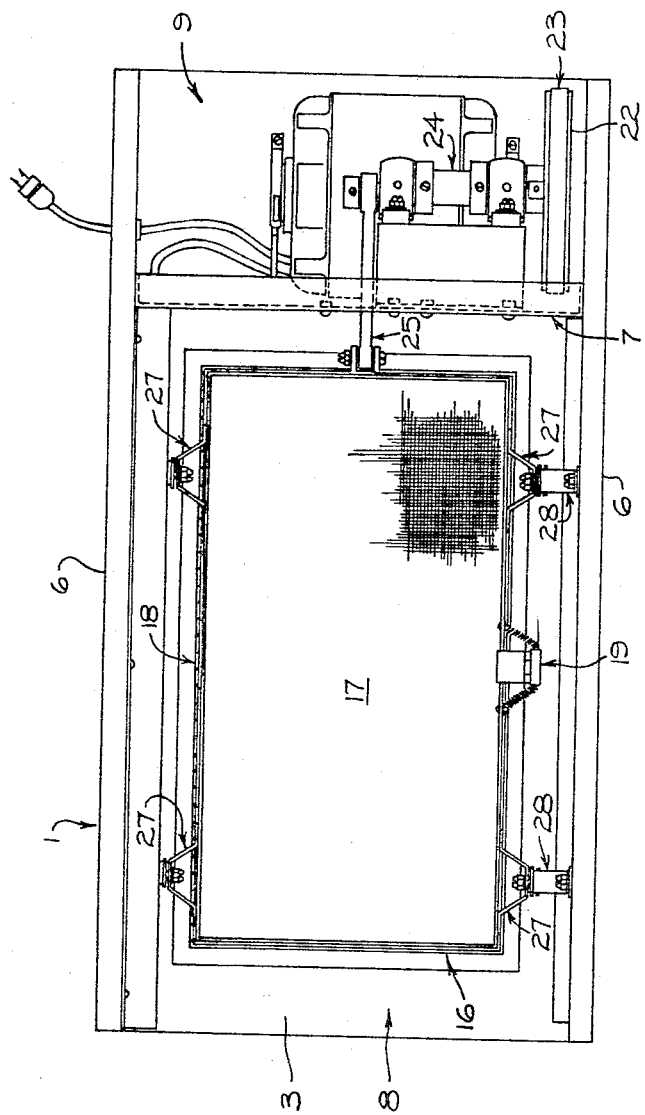

FIG. 4 is a top plan view of the flour sifter with its hopper and it sifted flour and dumpling receiving pans removed, showing the manner in which the screen bottom tray below the hopper is suspended from opposite sides of the sifter for reciprocal swinging movement longitudinally thereof, the drive means acting on said tray to move it reciprocally at high speed whereby it is vibrated, and the hinge and latch means whereby the screen bottom of said tray is secured in place; and FIG. 5 is a fragmentary, exploded top plan view on an enlarged scale showing the rotating drive shaft and the reciprocating arm having one of its ends journaled on an eccentric extension of said shaft whereby the screen bottom tray is vibrated.

Referring to the drawing, the flour sifter of the invention includes a rectangular housing, indicated generally by the numeral 1, which advantageously may be formed substantially of sheet metal, preferably stainless steel, whereby it may be kept clean at all times.

The housing 1 has a top 2, a bottom 3, a front end 4, a rear end 5, and two opposite sides 6, and has a transverse partition 7 whereby it is divided into a front compartment 8 and a rear compartment 9. The forward portion of the top 2, which has length and width dimensions coinciding with those of the front compartment 8, is open and has a sheet metal hopper 10 removably inserted in and suspended therefrom. The lower portion of the front end 4 likewise is open, for convenience in inserting and removing a sifted flour receiving pan 11 and a dumpling receiving pan 12 which are slidably supported one above the other within the front compartment 8, below the hopper 10.

The hopper 10 has an upper portion 13 which is characterized by its downwardly converging sides and ends, and has a lower portion 14 which is characterized by parallel sides and ends which extend downwardly from the corresponding sides and ends of the upper portion 13, in spaced apart relation to the adjacent sides and ends of the front compartment 8. The hopper 10 has maximum length and width dimensions coinciding with those of the front compartment 8, and has an outwardly extending marginal lip 15 whereby it is suspended from the upper edges of the adjacent sides and ends of said compartment, above the bottom thereof and above the sifted flour and dumpling receiving pans 11 and 12.

A rectangular tray 16, which has length and width dimensions slightly larger than those of the lower portion 14 of the hopper 10 and has a planar screen 17 extending across the bottom thereof and secured thereto by a hinge 18 and a spring biased latch 19 positioned on opposite sides thereof, is arranged immediately below the hopper 10, above the sifted flour and dumpling receiving pans 11 and 12, with the screen 17 in its operative position in closely spaced relation to the lower extremity of the hopper 10. The tray 16 is suspended from opposite sides of the front compartment 8 for reciprocal swinging movement in a longitudinal direction relative thereto.

An electric motor 20, which is arranged within the rear compartment 9, is drivingly connected by pulleys 21 and 22 and a belt 23 to a rotating drive shaft 24 which is supported for rotation about a horizontal axis which extends transversely of the housing 1. A reciprocating arm 25, which is movable reciprocally in a horizontal direction longitudinally of the housing 1 and extends through an opening therefor in the transverse partition 7, is pivotally connected at its forward end to the rearward end of the screen bottom tray 16 and has its rearward end journalled on an eccentric extension of the drive shaft 24 whereby the arm 25 is movable reciprocally at high speed, to thereby vibrate the screen bottom tray 16, in response to rotation of the drive shaft 24 about its axis.

In operation, flour to be sifted is deposited in the hopper 10, the sifted flour receiving pan 11 being in place below the hopper 10 and the screen 17 being secured in place by the latch 19, and the motor 20 is started by means of a push button switch 26 which is conveniently positioned on one of the sides 6 of the housing 1, forwardly thereof.

Upon completion of the flour sifting operation the motor 20 is stopped, the sifted flour receiving pan 11 is removed to thereby expose the dumpling receiving pan 12 below it, and the screen 17 is swung downwardly about its hinge 18, by manipulation of the latch 19, whereby the dumplings remaining in the hopper 19 are dumped into the dumpling receiving pan 12. The dumpling receiving pan 12 is then removed, and the operation is repeated.

The numerals 27 indicate two pairs of brackets which extend laterally outwardly from the tray 16, and the numerals 28 designate two pairs of links which are pivotally connected at their ends to the respective brackets 27 and to the sides of the compartment 8 whereby the tray 16 is supported on the sides of the compartment 8 for reciprocal swinging movement relative thereto.

The numeral 29 (FIG. 5) designates the eccentric extension of the shaft 24.

A conduit 30 is provided along one of the sides 6 of the housing 1 for the lead wires whereby the electric motor 20 is operatively connected to the push button switch 26.

The sifted flour and dumpling receiving pans 11 and 12 advantageously may be standard size pans of a type which are used extensively in restaurants, and advantageously may comprise the same pans which are used to flour the chicken or other food products as above described. The pans 11 and 12 may be used interchangeably with other like pans, one after another, whereby the flouring and sifting operations may proceed continuously, by batches, at the same time.

The flour sifter as described is compact and requires little space. The dimensions of the front compartment 8 and the hopper 10 are determined in part by the dimensions of the sifted flour and dumpling receiving pans 11 and 12, which for convenience are arranged one above the other within the compartment 8 so that one of the pans 11 and 12 is always in place.

Only the screen bottom tray 16, which is comparatively small and requires little space, is vibrated whereby the sifting mechanism which is required to accomplish the sifting operation, and the power requirements therefor, are comparatively small. The electric motor 20 advantageously may be of the order of about ¼ H.P., for example, and the stroke of the reciprocating arm 25 whereby the screen bottom tray 16 is vibrated may be of the order of about ⅜ inch.

All of the exposed surfaces of the sifter advantageously may be formed of stainless steel, whereby cleanliness may be promoted, and the hopper 10 as well as the pans 11 and 12 may be conveniently removed for cleaning.

The dumplings are removable from the bottom of the hopper 10 following the sifting operation without the need for handling them, by manipulation of the latch 19 whereby the screen 17 is movable downwardly about its hinge 18. The latch 19 is accessible from below the hopper 10 upon removing the sifted flour receiving pan 11.

The invention may be modified in various ways without departing from the spirit and scope thereof.

I claim:

In a flour sifter for commerical use, as in restaurants, for sifting for further use flour which has been used for applying surface coatings of dry flour, alone or in combination with suitable batters, to articles of food such as chicken, onion rings, fish, and bakery products, preparatory to cooking such articles, to separate and remove from the flour lumps, dough, or dumplings of predetermined large particle size, the combination of a rectangular housing. formed substantially of sheet metal, having a front end and a rear end and having a transverse partition whereby it is divided into a front compartment and a rear compartment, said front compartment being open at the top and having a front opening extending upwardly from the bottom thereof, a sheet metal hopper removably inserted in said front compartment, above the bottom thereof, and having length and width dimensions at the top thereof coinciding with those of said front compartment, the length and width dimensions of said hopper being progressively reduced in a downward direction, a rectangular tray having a screen bottom, and having length and width dimensions slightly larger than the lower portion of said hopper, arranged immediately below said hopper with its screen bottom in closely spaced relation thereto, and having means whereby it is suspended from the sides of said front compartment for reciprocal swinging movement longitudinally thereof, said screen bottom being secured to said tray by a hinge and a spring biased latch positioned on opposite sides thereof, a sifted flour receiving pan removably inserted in said front compartment, below said hopper and said tray, said pan having length and width dimensions coinciding with those of said front compartment, and having means whereby it is slidably supported for longitudinal movement therein, a dumpling receiving pan of like length and width dimensions slidably received in the bottom of said front compartment, below said first mentioned pan, a reciprocating arm having one of its ends connected to the rearward end of said tray and extending through an opening therefor in said partition, and means in said rear compartment for imparting a reciprocating movement to said arm whereby said tray is vibrated.

References Cited by the Examiner
UNITED STATES PATENTS

| | | | |
|---|---|---|---|
| 58,132 | 9/1866 | Pierce | 209—344 X |
| 74,091 | 2/1868 | Hoyt | 209—374 X |
| 178,618 | 6/1876 | Felix | 209—260 |
| 2,297,700 | 10/1942 | Hinkle | 209—370 X |
| 2,633,242 | 3/1953 | Rhodes | 209—236 |

HARRY B. THORNTON, *Primary Examiner.*

FRANK W. LUTTER, *Examiner.*

R. HALPER, *Assistant Examiner.*